United States Patent
Link et al.

(10) Patent No.: US 7,133,990 B2
(45) Date of Patent: Nov. 7, 2006

(54) SYSTEM AND METHOD FOR CONTROLLING ACCESS TO PROTECTED DATA STORED IN A STORAGE UNIT

(75) Inventors: Jean-Francois Link, Trets (FR); Dragos Davidescu, Aix-en-Provence (FR)

(73) Assignee: STMicroelectronics SA, Montrouge (FR)

( * ) Notice: Subject to any disclaimer, the term of this patent is extended or adjusted under 35 U.S.C. 154(b) by 183 days.

(21) Appl. No.: 10/474,018

(22) PCT Filed: Apr. 2, 2002

(86) PCT No.: PCT/FR02/01143

§ 371 (c)(1),
(2), (4) Date: Oct. 3, 2003

(87) PCT Pub. No.: WO02/082241

PCT Pub. Date: Oct. 17, 2002

(65) Prior Publication Data

US 2004/0117575 A1 Jun. 17, 2004

(30) Foreign Application Priority Data

Apr. 3, 2001 (FR) .................................. 01 04529

(51) Int. Cl.
*G06F 12/00* (2006.01)

(52) U.S. Cl. ...................... 711/164; 711/163; 713/201; 713/202

(58) Field of Classification Search ................... 71/164, 71/163, 100; 713/201, 202
See application file for complete search history.

(56) References Cited

U.S. PATENT DOCUMENTS 6,336,187 B1 * 1/2002 Kern et al. .................. 713/161

* cited by examiner

*Primary Examiner*—Kimberly McLean-Mayo
(74) *Attorney, Agent, or Firm*—Lisa K. Jorgenson; Stephen Bongini; Fleit, Kain, Gibbons, Gutman, Bongini & Bianco P.L.

(57) ABSTRACT

A system is provided for controlling access to protected data. The system includes storage means, protection means, an internal key, and means for receiving an input key from the outside. The storage means includes a protected zone for storing the protected data, and a command input for denying or authorising access to the protected data. The protection means controls access to the protected data by selectively activating the command input of the memory. The protection means authorises access to the protected data only when the internal key and the input key are identical. Also provided is a method for controlling access to protected data stored in a protected zone of a storage means. According to the method, an input key is received from the outside, and access to the protected data is authorised only when the input key and an internal are identical.

20 Claims, 8 Drawing Sheets

SYSTEM AND METHOD FOR CONTROLLING ACCESS TO PROTECTED DATA STORED IN A STORAGE UNIT

CROSS-REFERENCE TO RELATED APPLICATIONS

This application is based upon and claims priority from prior French Patent Application No. 01/04529, filed Apr. 3, 2001, the entire disclosure of which is herein incorporated by reference.

BACKGROUND OF THE INVENTION

Description

This invention relates to protection of the confidentiality of data stored in a storage unit, and particularly in a read-only memory. In particular, this memory may be a semiconductor ROM (Read-Only Memory) type of memory, for example that will contain a program in the form of a source code. This type of memory is used within a chip forming a microcontroller, connected to various functional units of the microcontroller by internal buses. Data stored in the ROM memory are only used inside the microcontroller, for example to execute a user program. It is frequently unnecessary and undesirable for the final user of the microcontroller to read data in the ROM memory from the outside. These data may apply to protected software, or proprietary or personal information. In this respect, note that the contents of a memory cannot be deduced by the microcontroller observing execution of a code stored in the ROM memory.

Moreover, a test mode is usually provided to check the contents of the memory from the outside in order to determine if the memory is programmed correctly and if the read circuits are operating correctly. There are several methods of controlling this memory test mode. Typically, the test is controlled by a signal applied to a memory validation or selection input, referred to as the CS (Chip Select) or CE (Chip Enable) input.

Most solutions used to protect the contents of a memory such as a ROM memory from being read, mean that this CS input has to be authorised in a user mode to enable execution of the program contained in memory, but is disabled when the memory is put into test mode by an unauthorised user, i.e. outside allowable test conditions.

One conventional technique for satisfying this condition is to provide a fusible link within the memory. The fusible link is designed to shunt the read protection and therefore to enable systematic access to the memory contents, for example using a "dump" mode. In this manner, the memory manufacturer or programmer can use the test function at an initial stage to read the memory and check that it does not contain any erroneous data. Once this initial test has been completed, it will break the fusible link, for example by applying a breakdown voltage, to ensure that the protection can no longer be bypassed. From this moment on, test mode is no longer accessible. The memory can only be accessed to execute the code.

This approach, which is a "static" option, requires additional manufacturing steps to make the fusible link, which increases the costs and efficiency of manufacturing. Another disadvantage is that it inhibits reading data in test mode permanently after breakdown of the fusible link, which is not always desirable.

Another known approach consists of setting up a confidential combination or sequence of logical signals to be applied to selected memory inputs. A correct combination or sequence of logical signals provides access to data stored according to a test mode. This type of coding remains relatively simple and frequently does not provide adequate security, unlike the solution based on a fusible link. The use of this type of protection is based on logical circuits and registers separate from the memory zone. These elements make combinational logic on access signals to test mode to output (or not output) the validation signal that enables access to test mode.

When the memory in question is integrated in a set of circuits, as is the case of a microcontroller, an additional protection is obtained when the memory test mode outputs a global indication of the contents rather than each individual data item (for example in the form of stored bytes). This global indication is usually the result of an algorithm known as a "checksum", applied accumulatively by an internal unit to each tested data item in memory. The result is then a numerical value that is influenced by each byte tested. This value is output and compared in a circuit with the value to which it must correspond, if all the tested data are correct. During execution of the algorithm mentioned above, the memory is put into "dump" mode in order to dump the data in its successive addresses to the internal execution circuit of the algorithm. Note that the value produced at the output is the result of a large number of stored individual data and is not sufficient to reconstitute these data afterwards. In other words, the value of the result of the algorithm does not reveal the memory contents, but simply whether or not it is conform. The intention is to further improve security, making sure that the result of the algorithm cannot be transmitted unless a sufficient number of tested data, or perhaps all the data, have been processed by the algorithm.

This solution provides a good level of security and a good test coverage, but as a result of its basic function, it can never be used to read individual values stored in memory from outside the memory. For example, it is not possible to make an error analysis when the read test reveals that the memory does not work on a part such as a microcontroller and that it is useful for the diagnostic to know which byte is in fault.

SUMMARY OF THE INVENTION

Considering the above, the invention relates to a device and a method to protect the confidentiality of the contents of a memory, particularly a ROM type memory, while authorising individual data to be read from outside the device within a restricted framework.

More precisely, a first purpose of the invention is to propose an access control system to protected data stored in a storage unit, comprising:
  storage means with a protected zone for storing protected data and a command input for denying or authorising access to these data, and
  validation means to control a request for access to protected data by selectively acting on the command input,
  characterised in that it includes an internal key and in that it comprises means for inputting an input key provided from the outside, the validation means authorising access to protected data only when there is conformity between the internal key and the input key.

Advantageously, the internal key is stored in the storage means, and particularly in the protected zone containing the protected data.

The validation means are preferably connected to an internal link for loading the internal key and an external link for loading the input key, the validation means also comprising means of denying data communication preventing a transfer of data from the internal link to the external link when the internal key can be present in the internal link.

The external link may be a data input and output system governed by the JTAG protocol, the denying means acting on a validation input of the JTAG protocol. JTAG stands for "Joint Test Action Group".

The internal link can form part of a data bus of a circuit comprising a central processing unit CPU, the validation means including means of inhibiting the central processing unit and independently controlling the data bus and loading of the internal key.

The means of inhibiting the central processing unit can act on the clock input.

According to one embodiment, the storage means comprise a read control zone in which commands to read the internal key are stored.

The read control zone may be governed by a different command from the command to read the protected zone.

The internal key may be loaded in the validation means by putting storage means in dump mode.

In the envisaged applications, the system can take action to control access to data from outside during a test mode.

The internal key may occupy one or several addresses, for example each being considered as occupying one byte. When it occupies several addresses, the validation means advantageously comprise means of loading parts of the internal key from their corresponding addresses and the corresponding parts of the input key, and to authorise access to protected information only if there is conformity between these parts.

The system may be integrated in a microcircuit comprising a central processing unit such as a microcontroller or a microprocessor.

It may also be integrated in a function block for storing data forming part of a microcircuit.

In the latter case, the validation means are preferably inserted between firstly a memory network comprising protected data and the internal key, and secondly connection ports to data and address buses and the CS (Chip Select) validation input.

The microcircuit may comprise an element (test option) to select the use of a protection key at an initial stage.

In all the embodiments described, the storage means comprise a semiconductor ROM type read-only memory, for example designed to store protected data that form a source code of a microprogram.

According to a second aspect, the invention relates to a microcircuit comprising means of executing a microprogram contained in the storage means, characterised in that access to elements of the microprogram from outside the microcircuit is controlled by a system for controlling access to the stored protected data as described above.

According to a third aspect, the invention relates to a semiconductor memory, characterised in that it comprises a system for controlling access to stored protected data as described above.

According to another third aspect, the invention relates to an access control method for protected data stored in a protected zone of the storage means, these storage means being provided with a command input for denying or authorising access to these data, characterised in that access to the protected data is only authorized when there is conformity between an internal and an input key provided from outside.

The optional characteristics of the invention presented within the context of the system are applicable to the method defined above, making the corresponding changes.

The solution conform with the invention is based on a static option. In the preferred embodiment, the memory storage zone reserves one or several locations for binary word (for example bytes), to store a confidential key. This key may be chosen by the person who makes the stored data confidential, for example the memory manufacturer or a third party who owns the data. The contents of this key may vary arbitrarily as a function of various criteria (for example depending on the data contents, the physical support, etc.) but the position of the key in memory is advantageously fixed in advance.

If the memory is used to store a user program (user software code), the key is preferably stored in this code. Consequently, it is not accessible with a conventional test, since the memory zone containing the user software code is protected. Under these conditions, the memory can be read as follows: firstly, a key is input in a particular test mode to read the key in memory internally, but which prevents this key from being communicated towards the outside. At the same time, a predefined protocol is used to input the key in the circuit associated with the memory, for example by loading a register. The next step is to keep the circuit in this special mode while reading the key stored in memory, and then comparing this key with the value stored in the register. If the comparison shows that the two keys are identical, the memory becomes accessible until the end of the test and its contents may be communicated towards the exterior. Otherwise, the memory remains protected and the above-mentioned special mode is terminated.

BRIEF DESCRIPTION OF THE DRAWINGS

The invention and the resulting advantages will be better understood after reading the following description of preferred embodiments, given as non-limitative examples only with reference to the appended drawings, wherein.

DETAILED DESCRIPTION OF PREFERRED EMBODIMENTS

Figure 1:
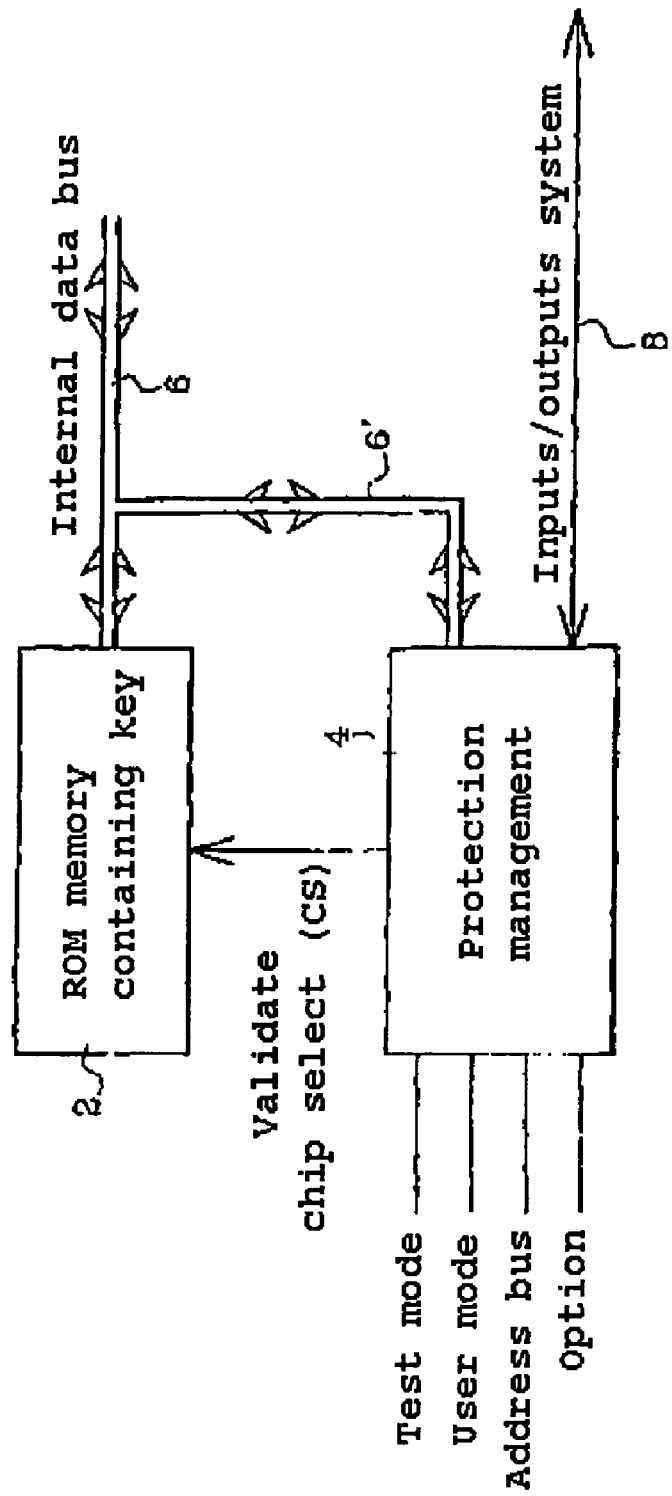
FIG. 1 is a block diagram showing the principle of the invention in the case of a protected ROM type memory associated with a protection management system within a single microcircuit, for example a microcontroller.

FIG. 1 shows a memory 2, the contents of which have to be protected in read, and in this case a read only memory (ROM) and a protection management system 4 according to a first embodiment. The role of the system 4 is to make sure that the contents of the memory 2 can only be inspected under secure conditions.

The memory 2 and the protection management system (hereinafter referred to as the protection system) 4 are integrated in the same integrated circuit, which may constitute a microcontroller or a microprocessor. In the example considered, the protected contents of memory 2 consist of a "user program" type microprogram used to carry out functions programmed using a central processing unit (not shown). During normal operation (not in test mode), source code data for the user program remain internal to the integrated circuit, and are not accessible from the outside. They transit to the central processing unit or other units in the circuit through an internal data bus 6 connected to data outputs from the memory 2.

A test mode is also provided with access protected through a coded key supplied from outside the circuit. If this key is conform, it then becomes possible to read the contents of the memory 2 from the outside for the purposes of the test, for example by giving a command to start a mode with sequential output of data between two addresses (dump mode).

If authorisation is given, the memory data transit via the management system 4 through a branch 6' of the internal data bus. They are then sent towards the outside from the management system 4 on an input/output system 8, such as a communication interface.

For operation of the key controlled protection, the protected memory 2 stores the key (that will be denoted by the term "reference key" in the remainder of the description) in the memory zone that contains the protected data. This makes it impossible to access the internal key under normal conditions. The address of the reference key in memory is predetermined and known to the management system 4.

Operation of the management system 4 is governed by different command signals accessible through the inputs/outputs system 8, including:
- a "test mode" signal which selects test mode (for example by a logical state 1). Selection of test mode enables the memory contents 2 to be output towards the outside, provided that the access key is presented;
- a "user mode" signal that selects normal operating mode of the circuit, by reading the memory 2 internally only during execution of the user program;
- the memory addresses to be read in test mode are supplied to the protection system 4 through an address bus. The addresses may be incremented sequentially to perform a "dump" mode; and
- an "option" signal to choose if the protection system is to be used at an initial stage. This option physically creates all key protection means without automatically imposing it to the customer. In the following, it is assumed that the protection option is actually chosen, which corresponds to the option signal being fixed in the 1 state.

When test mode is selected, the protection system waits for an input key to be entered on the inputs/outputs system 8. It reads the internal key from the memory 2 through the branch 6' and makes a comparison between these two keys. If they are identical, the protection system 4 sends a logical state to validate reading memory 2 by a direct link on the Chip Select (CS) or Chip Enable (CE) input of memory 2.

Note that reading this key is a fundamental operation, since the key controls the protection. The key must never be accessible from outside the circuit in which the memory 2 is contained.

Figure 2:
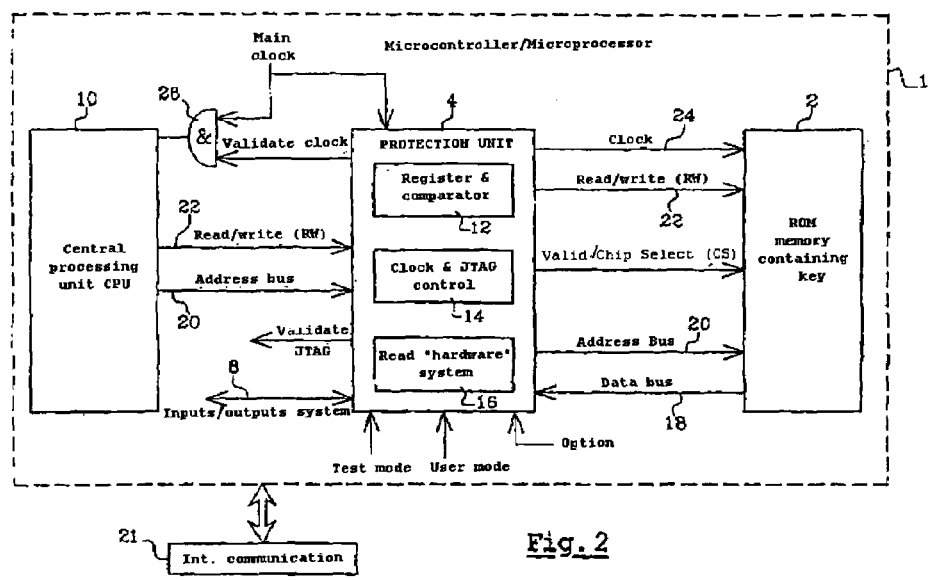
FIG. 2 is a block diagram of the main circuit elements acting according to a first embodiment of the invention, based on reading a key in memory managed by hardware means.

FIG. 2 illustrates an embodiment of the principle of the invention by essentially hardware means. In this case the protection system is materialised by a protection unit 4 made essentially in hardware, which is inserted between the ROM memory 2 and the central processing unit (CPU) 10 of the microcircuit in which it is included. In particular, this microcircuit (integrated circuit) may be a microcontroller or a microprocessor 1 that uses the memory 2 for example to store the software code.

The protection unit 4 comprises three function assemblies:
- a register and comparator block 12 designed for storage of the reference key extracted from memory and the input key, and for a comparison between these two keys. It sends a logical signal internally signalling whether or not these two keys are identical;
- a circuit to control the integrated circuit main clock and output of data towards the outside. To control output of data towards the outside, the circuit acts on the data output validation command according to the JTAG protocol that controls data exchanges on the data bus 18, and
- a hardware read system that manages reading the internal key from the memory 2.

The unit 4 also controls taking the central processing unit 10 out of service during the critical phases to transfer the internal key to the register 12. In the example, this feature is obtained by means of an AND gate with two inputs 26, one connected to the arrival of main clock signals and the other connected to an enable/disable output from the protection unit 4, the output from the AND gate being connected to the input of the central processing unit clock. Consequently, the enable/disable output enables denying the central processing unit 10 by the presence of a logical state 0 at its enable/disable output.

The internal channels of the circuit composed of the address bus 20, the read/write (RW) bus 22 and the arrival of the main clock 24 arrive at the memory through the protection unit 4. Furthermore, the protection unit 4 produces the logical enable signal (Chip select) CS to read the memory under its own control.

In the example, the inputs/outputs system 8 is connected to a communication interface 21 that forms a port with the external environment.

Figure 3:
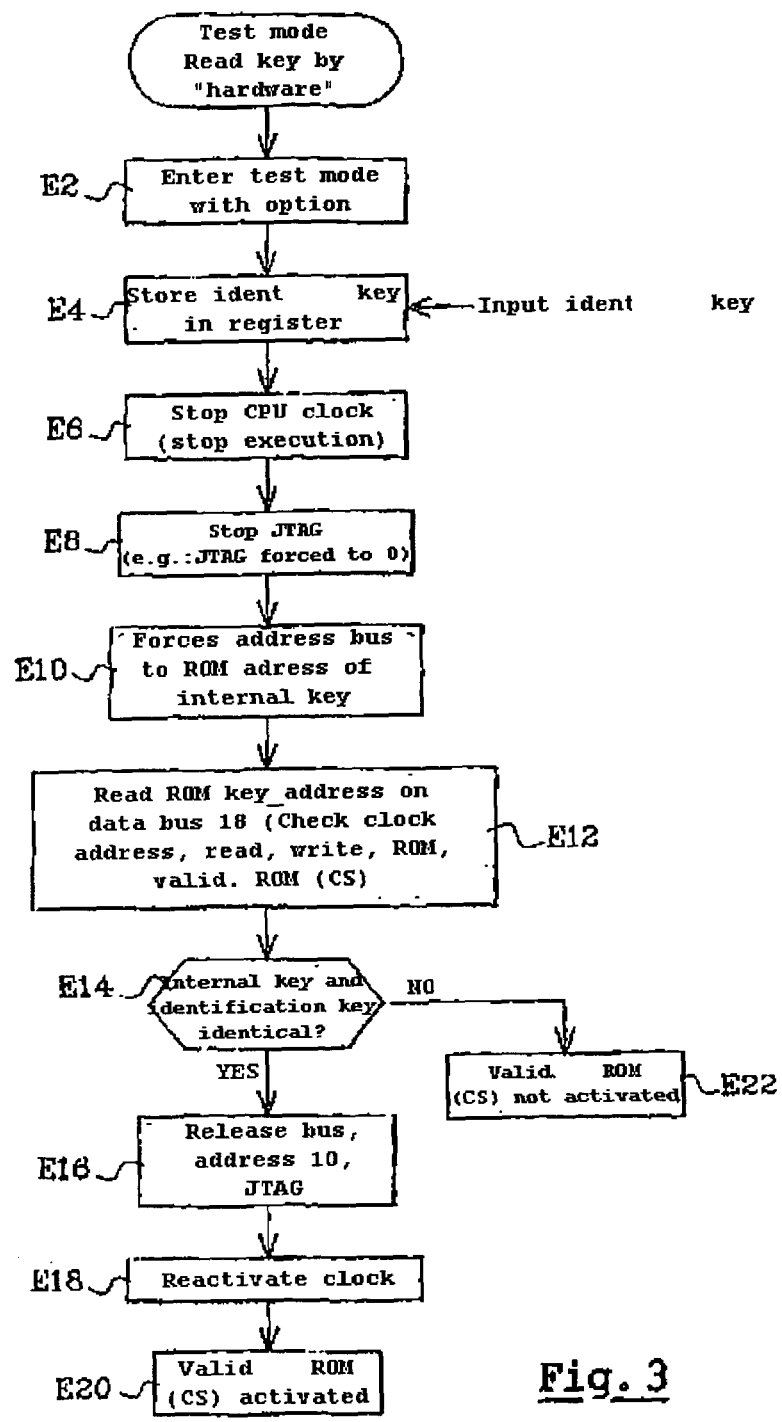
FIG. 3 is a flowchart showing the validation steps of the test mode when the circuits in FIG. 2 read the key.

The steps involved in secure provision of test mode including reading the internal key by hardware means will be described with reference to FIG. 3.

Test mode is started by applying a logical state 1 to the "test mode" input of the protection unit 4, assuming that the option to make this mode available was preselected when the memory 2 was produced (step E2).

The next step is to enter the input key from the outside into the register of the assembly 12, through the inputs/outputs system 8 using the JTAG protocol (step E4).

In response, the protection unit 4 sends a logical state 0 to its enable/disable output in order to deny the arrival of clock signals to the central processing unit 10 (step E6). Starting from this moment, the protection unit 4 takes control of the address bus 20 and the clock at the memory 2, and inhibits the system for outputting data towards the outside (step E8). This may be disabled by blocking application of the JTAG protocol that communicates the contents of the data bus 18 towards the outside. In this way, the data output paths from the memory towards the outside are blocked, while waiting for the internal key to be read on this data bus.

The protection unit 4 then forces the address bus 20 to choose the memory address 2 at which the internal key is stored (step E10). This address is recorded and permanently fixed within the protection unit 4 and corresponds to a predetermined protocol. Note that the key may contain one or several bytes (if it contains several bytes, the system will be programmed to select and record the sequence of corresponding addresses).

Data related to the internal key are thus read from memory 2 and loaded in a register of the set 12 through the data bus (step E12). The input key and the internal key are analysed in the comparator to determine if they are identical (step E14).

If they are identical, test mode is authorised. The entire circuit is then activated once again. The protection unit 4 then commands that the address bus 20 should be released and the JTAG protocol restarted to enable data circulation (step E16). The protection unit 4 also gives a command to put the central processing unit 10 back into service through the clock enable signal (step E18), releasing the address bus 20 and authorising output of data from the memory 2 towards the outside, by actuating the Chip Select (CS) input (step E20). It is thus possible to collect these data on an external device to check if they are valid. Consequently, the memory can be put in dump mode or in any other appropriate mode.

If they are not identical, test mode is refused and memory 2 remains blocked in read by disabling the Chip Select (CS) validation input (step E22). If it is observed that the incorrect input key is entered, the protection unit 4 can also give commands for other actions depending on a choice made by the system designer, for example to enable a loopback to steps E3 or E4 a limited number of times to enable the input key to be input once again (for example a limit of three consecutive attempts can be fixed), to keep the circuit blocked, record that the results are different to inform an external source, etc.

Figure 4:
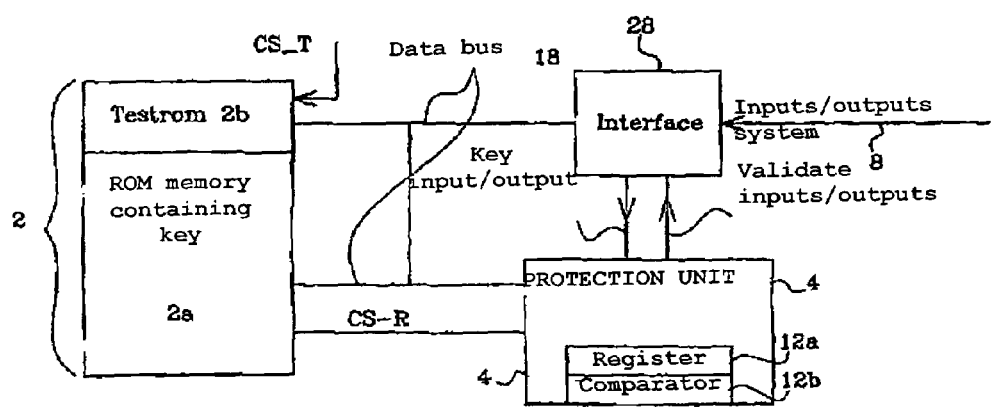
FIG. 4 is a block diagram of the main circuit elements acting according to a second embodiment of the invention, based on reading a memory key managed by software means.
Figure 5:
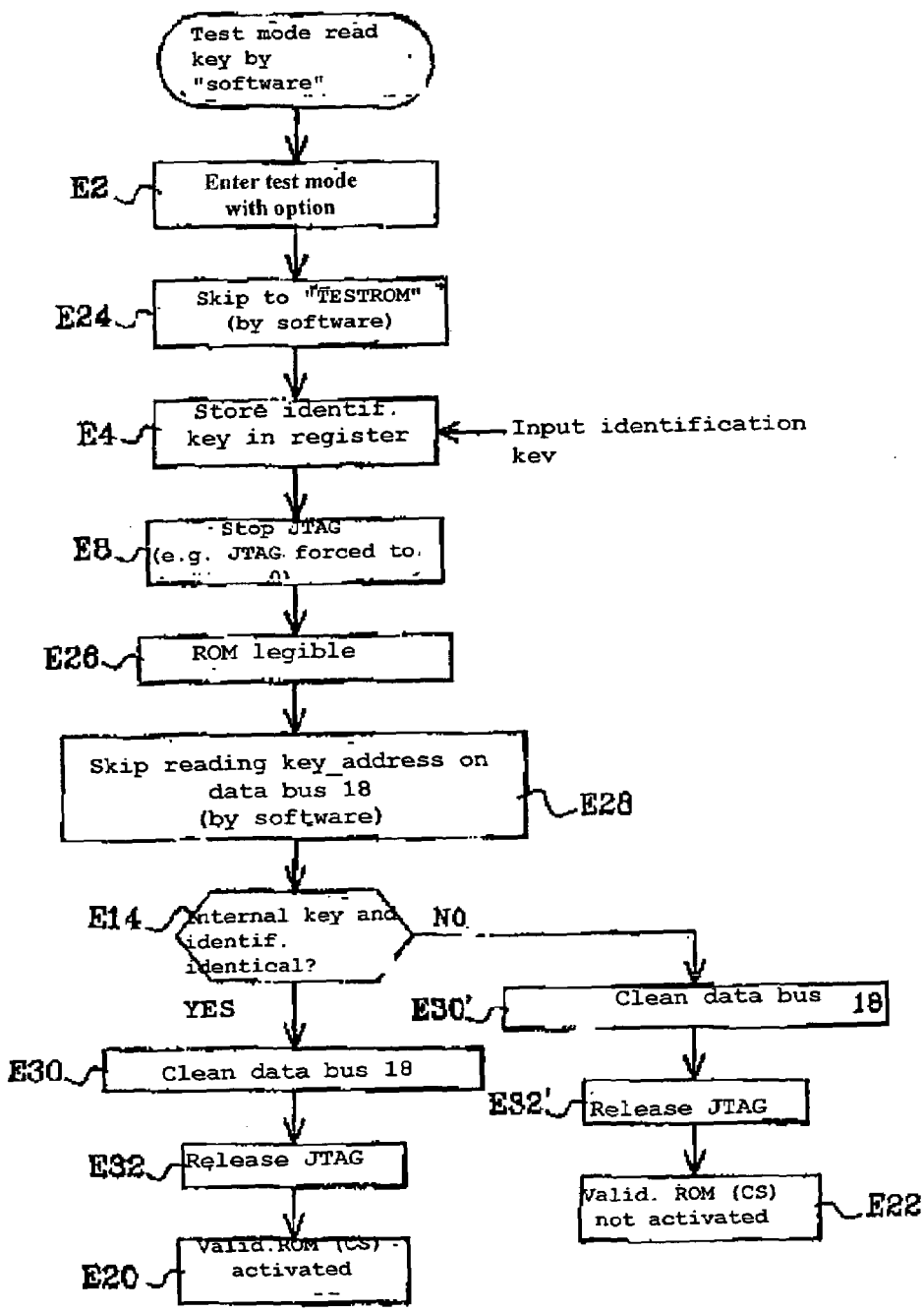
FIG. 5 is a flowchart of test mode validation steps when the circuits in FIG. 4 are used to read the key.

We will now describe a second embodiment of the invention with reference to FIGS. 4 and 5, by which the key in memory is read mainly by software means stored in the memory 2 itself (part 2a). In this case, the input protocol in test mode may use a secure memory reading circuit.

Hardware means are used to block data output towards the outside and the possibility of executing an external code (for example by disabling execution of the JTAG protocol) and a program stored in part 2b of the memory 2 reserved for the test ("TESTROM" part) is executed. At the same time, the protection of the memory 2 is deactivated. The program reads the key, stores it in a register, modifies the data bus 20 to erase all traces of the key and releases communication systems 8 with the outside. The comparison is always made using hardware means and the result determines whether or not memory test mode can be accessed.

FIG. 4 shows the main elements used in this embodiment. An interface unit 28 within the circuit commands a data exchange between the outside and the protected memory 2, and the protection unit 4. It is inserted particularly between the data bus 18 and the inputs/outputs system 8. Access to the "TESTROM" part 2b is controlled by a specific CS-T (Chip Select TESTROM) validation input. Access to part 2a containing the internal key with protected data is controlled by a CS-R input (Chip Select Remainder of memory).

The steps involved in providing secure test mode in which the internal key is read using software means will be described with reference to FIG. 5. Steps corresponding to the steps in FIG. 3 are identified in a corresponding manner.

This mode begins with entry into test mode with activated option, as for the previous case (step E2). When the request to enter test mode is made, the circuit main software (that may be stored in the ROM memory 2) sends a command to skip to a key checking routine (TESTROM) (step 24), this routine being stored in part 2b of the memory 2. Access to this portion of memory is then controlled using the CS_T (Chip Select TESTROM) signal, originating from the protection unit 4 or another part of the circuit.

The circuit then goes into waiting for an input key and when the input key is presented on the inputs/outputs system 8, stores it in the register 12a provided for this purpose in the protection unit (step E4). The TESTROM software then controls blockage of any data communication with the outside by stopping the JTAG protocol, for example by forcing its validation input to zero (step E8). The ROM memory 2 is then made legible in its part 2a in which the internal key is stored, without the risk of any loss of confidentiality.

The TESTROM routine sends a command to read the internal key so that it can be transmitted on the data bus 18 towards the register 12a of the protection unit 4 (step E28). Consequently, the TESTROM software stores the predetermined address(es) of part 2a of memory 2.

The input key supplied from the outside and the internal key are then both registered in respective portions of the above mentioned registers 12a. These two keys are compared to determine whether or not they are identical (step E14).

If they are identical (input key correct), the TESTROM software sends a command to clean the data bus 18 to remove the internal key, since this bus will have become accessible once again (step E30). Cleaning is done by forcing an arbitrary value, for example the value 00, that does not convey any useful information on the data bus 18.

The TESTROM software then sends a command to release blockage of the JTAG protocol to enable the data to be output on the inputs/outputs system 8 (step E32) and validates activation of read mode (Chip Select) of the memory, to read the data in the memory from the outside using the inputs/outputs system 8 (step E20).

If they are not identical (input key incorrect), the TESTROM software firstly sends a command to clean the data bus (step E30'), and releases blockage of the JTAG protocol (step E32'), in the same way as steps E30 and E32 mentioned above. This release is justified by the fact that in the example, entering an incorrect input key does not block normal operation (user mode). However in this case, the memory 2 is kept blocked in read for a test mode, holding the Chip Select (CS) input inactive (step E22).

We will now describe a third embodiment of the invention, by which the internal key is read using a data dump mode.

Data dump mode is a memory test mode in which the byte corresponding to the current address passes on the data bus 18 to a checksum unit, and the current address is incremented or decremented, during each clock cycle applied to its input. The checksum unit processes each byte thus extracted as a digital value on which an algorithm calculation is carried out. This calculation is recursive in the sense that the result of a previous calculation is combined with the current value. In this way, the result of the last algorithmic calculation depends on each of the values extracted from the memory. This result is usually provided at the output to an external circuit to check data validity, without becoming familiar with the data.

Figure 6:
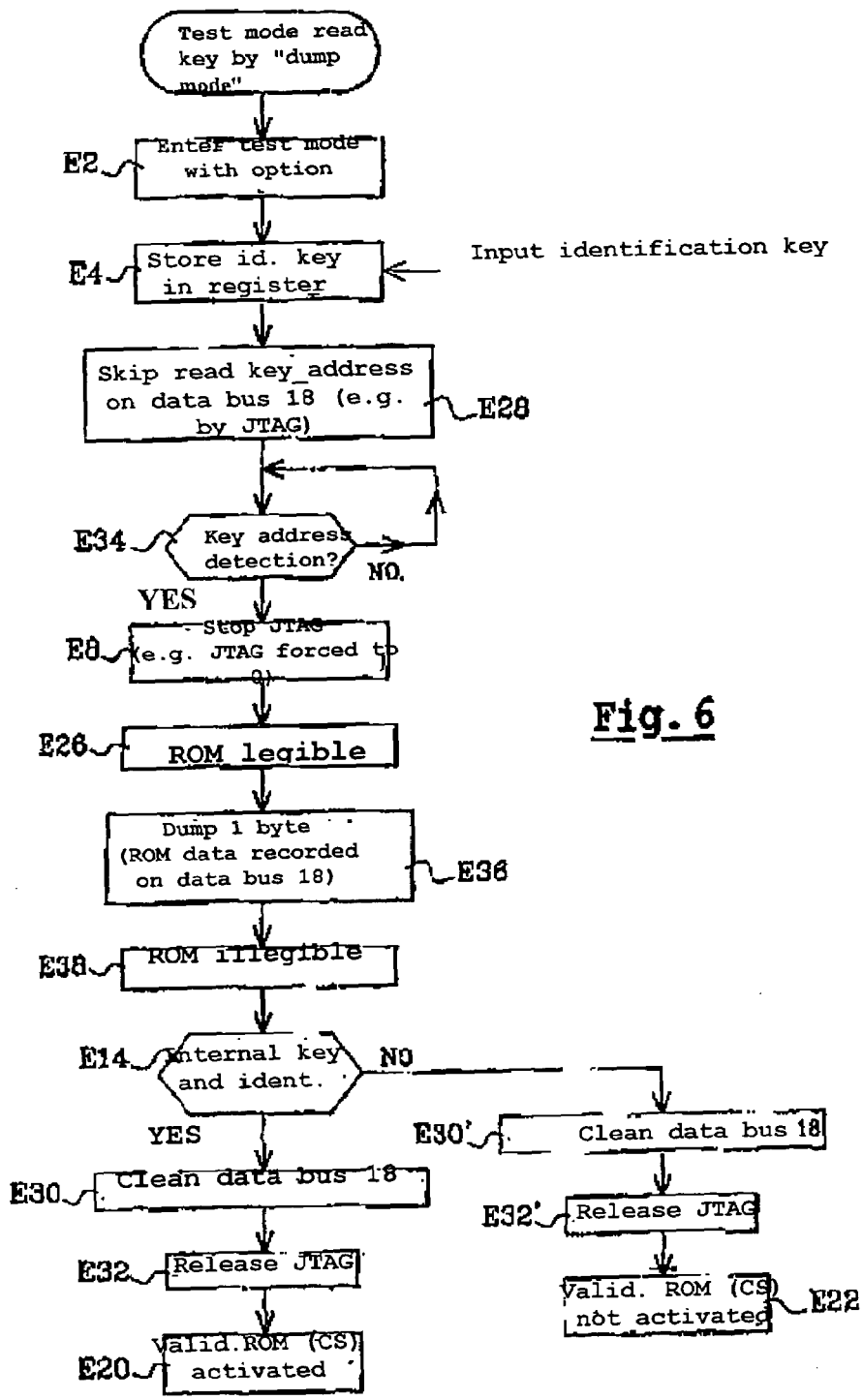
FIG. 6 is a flowchart of test mode validation steps in accordance with the invention, when this mode is a dump mode.

If this mode is used with an appropriate circuit, a controlled sequence to read the internal key can be carried out using a procedure that will be described with reference to the flowchart in FIG. 6. Common steps or steps corresponding to steps in FIGS. 3 and/or 4 have the same references and will not be described again, for reasons of conciseness.

We enter test mode with the option activated (step E2) to begin test mode operations by reading the key in dump mode (step E2).

The circuit then starts waiting for the input key input manually from the outside. This key is stored in register 12*a* of the protection unit 4 (step 4).

The TESTROM software causes an address skip to read the internal key, for example by acting on the configuration of the JTAG protocol (step E28). The circuit moves into position to detect this key address (step E34). When it is detected, the program deactivates communication mode by inhibiting the JTAG protocol (step E8) and authorises reading the contents of data stored in the ROM memory 2 (step E26) by activating its Chip Select (CS) validation input.

Since the ROM memory 2 is in dump mode, the byte comprising the internal key is output in the next clock cycle (step E36). This byte transits on the data bus 18 to the register 12*a* of the protection unit 4.

In the next clock cycle, the memory 2 is taken out off dump mode and is protected again (step E38).

The remainder of the method is identical to steps E14, E20, E22, E22', E30, E30' and E32' in FIG. 5 and its description will not be repeated. Thus, the comparison enables a changeover to test mode if the reference key (in this case obtained by dump mode) and the identification key are identical.

Note that the data bus can also be cleaned (steps E30/ E30') by forcing a value without any information (for example 00).

The key can be read by dump mode in all the embodiments described, provided that any necessary modifications are made.

All methods of reading the internal key in the protected memory enable the use of a key coded either on a single byte or on several bytes. Use of a key containing several bytes simply requires an adaptation of the method to read and load a sequence of bytes corresponding to the key, in turn.

For example, a byte can be input recursively to form part of the input key (see step E4 in FIGS. 3, 5 and 6), and can be compared with a corresponding byte of the internal key (see step E14). An internal register, for example at the protection unit 4, retains comparison results for each input and compared byte of the reference and identification keys. The memory will then be unlocked only if the compared bytes of the reference key and the identification key are identical in every comparison. The memory remains locked if at least one bit in the input key does not correspond to the internal key.

In one embodiment with a key encoded on several bytes, all bytes of the internal key can be loaded from the protected memory to a rewritable memory (RAM) at the beginning of the validation method. This approach is particularly advantageous when the key is read by software means (see FIG. 4). The TESTROM software can then be executed in protected mode (JTAG protocol disabled) to load bytes one after the other in the intermediate register. However, the comparison is made by hardware resources (comparator 12*b*, see FIG. 4).

It can be understood that the invention can be used in any integrated circuit that comprises a memory connected to other elements in the integrated circuit through an internal bus.

The entire memory protection mechanism using a coded key may be integrated in a function data storage block contained in such an integrated circuit. This function block will then include more or less the same inputs and outputs as a simple memory block, while making it possible to protect data by a key following the principle according to the invention. For example, this arrangement may be made by placing the protection unit between these storage cells and the data output. Furthermore, there is no need for any communication system (like the JTAG protocol) to be locked during the identification.

Figure 7:
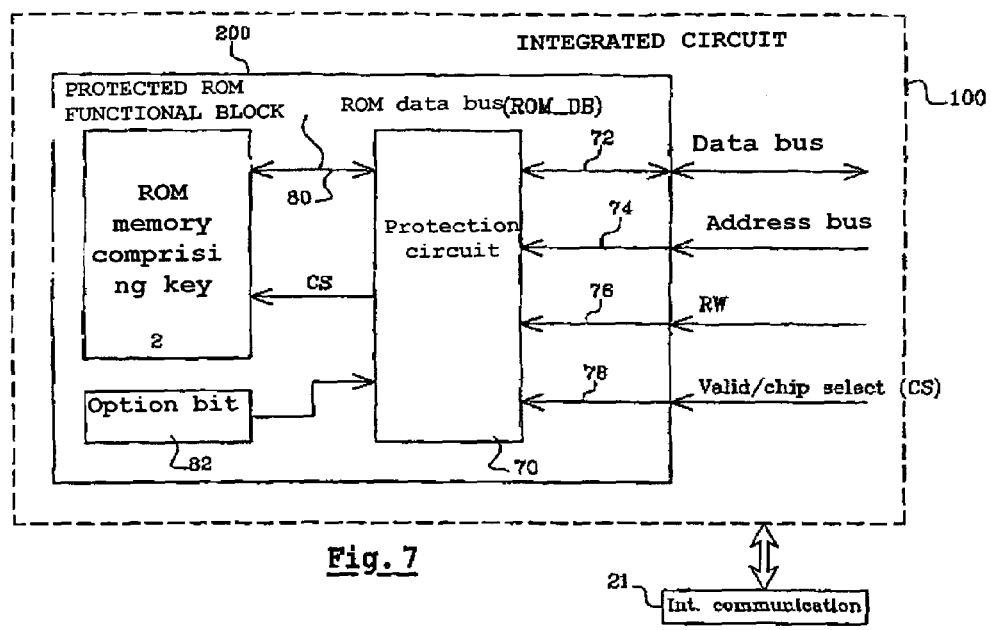
FIG. 7 is a scheme for a ROM memory function block in an integrated circuit, provided with protection circuits according to the invention.

FIG. 7 shows an example embodiment of such a protection integrated in a memory function block 200 that forms part of an electronic system integrated on a microcircuit 100. This microcircuit may be a microcontroller or a microprocessor corresponding to that in FIG. 2. The function block 200 comprises firstly a ROM memory 2 which contains firstly protected data and the coded key (internal key), and secondly a protection circuit 70. The protection circuit forms an interface screen between the memory 2 and inputs/ outputs in the rest of the microcircuit. In this manner, the protection circuit 70 makes connections 72 to an external data bus (stored data output), connections 74 to an external address bus, a read/write input RW 76, and a Chip Select (CS) validation input 78.

The ROM memory 2 communicates data in memory to the protection circuit 70 through data bus 80 internal to the storage function block 200. This bus is connected to the data output connections 72 controlled by the protection circuit.

The protection circuit 70 sends the validation signal CS as output for the network under its control. The protection circuit is put into operation under the control of an "option" bit originating from a cell 82 contained in the storage block 200 and programmed during manufacturing. Setting this bit equal to the 1 state validates operation of the protection, while setting it to the 0 state makes the circuit transparent; the protection is then inoperative.

Figure 8:
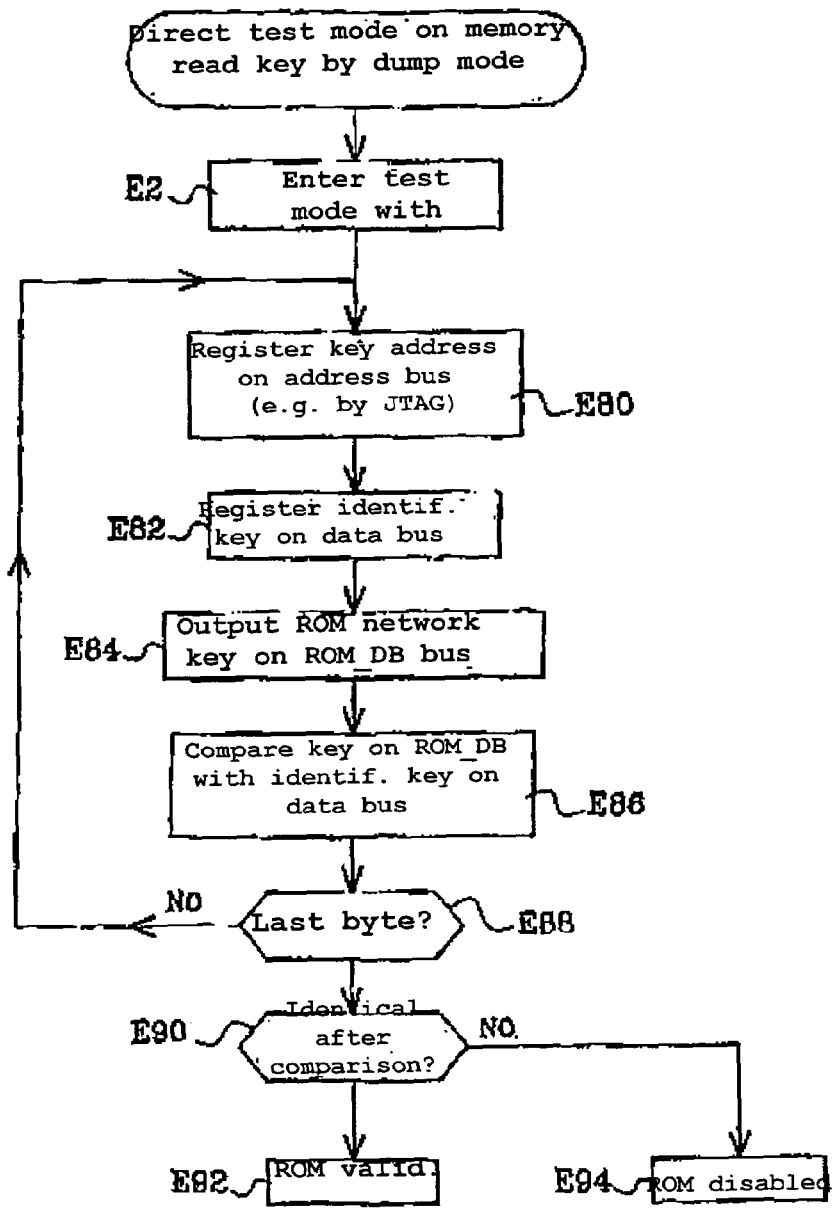
FIG. 8 is a flowchart describing the key check method unit and the protection circuit.

The key check method unit and the protection circuit 70 will be described with reference to the flowchart in FIG. 8.

As for the previous cases, the first step is to activate the input in test mode (step E2), assuming that the option is activated.

The next step is to select the address of the ROM memory 2 on the address bus at which the byte of the internal key is stored, or the first byte of this key if this key is coded on several bytes (step E80). For example, this address may then be delivered using the JTAG protocol, either automatically by the protection circuit 70, or externally.

The corresponding byte of the input key is presented from outside the function block 200 on the data bus (step E82).

The byte located at the address selected in step E80 is output on the ROM_DB bus 80 internal to function block 200 (step E84). The protection circuit 70 then includes bytes corresponding to the internal key (through this internal bus) and the checksum key (through the data bus).

These two bytes are compared and the result of the comparison is stored in an internal register (step E86).

The protection circuit 70 then determines whether or not there is another byte to be processed (step E88). If there is, the method goes back to the beginning of step E80 to make a new comparison with the next byte in the coded key.

When there is no new byte to be processed, it is determined if the overall comparison shows that the compared byte or each compared byte (step E90) is identical. If it is, it is considered that the input key is correct and the storage function block 200 is validated in read (step E92).

If it is not, the protection circuit 70 prevents reading of memory 2 by applying a logical state corresponding to the validation input (Chip Select) CS (step E94).

It would be understood from the above that the protection is remarkable in that it is based on the use of a key stored in the protected part of the memory, for example the part that contains the user's program. This key may be made different for each type of stored contents, for example specific to each user's program code. It may be chosen by the customer, and its size (number of bits) has practically no effect on the size of the decoding circuit associated with the memory.

Key controlled access makes it possible to carry out a complete test of the memory (if the input key is correct), particularly the output of each byte on the memory data bus or the appropriate port in the circuit in which the memory is integrated. Although it might be possible to pirate a code as soon as the key corresponding to it and the key input protocol are known, it is very difficult and tedious to find a relatively long key (for example 128 bits or more) by knowing the protocol. Therefore, the invention provides an excellent degree of security.

What is claimed is:

1. A system for controlling access to protected data, said system comprising:
   storage means including a protected zone for storing the protected data, and a command input for denying or authorizing access to the protected data;
   protection means for controlling access to the protected data by selectively activating the command input of the memory;
   an internal key; and
   means for receiving an input key from the outside,
   wherein the protection means authorizes access to the protected data only when the internal key and the input key are identical,
   the protection means is connected to an internal link for loading the internal key and an external link for loading the input key,
   the protection means includes means of denying data communication for preventing a transfer of data from the internal link to the external link when the internal key is present on the internal link,
   the external link is a data input and output system governed by the JTAG protocol, and
   the means of denying data communication acts on a validation input of the JTAG protocol.

2. A system for controlling access to protected data, said system comprising:
   storage means including a protected zone for storing the protected data, and a command input for denying or authorizing access to the protected data;
   protection means for controlling access to the protected data by selectively activating the command input of the memory;
   an internal key; and
   means for receiving an input key from the outside,
   wherein the protection means authorizes access to the protected data only when the internal key and the input key are identical,
   the protection means is connected to an internal link for loading the internal key and an external link for loading the input key,
   the protection means includes means of denying data communication for preventing a transfer of data from the internal link to the external link when the internal key is present on the internal link,
   the internal link forms part of a data bus of a circuit comprising a central processing unit, and
   the protection means includes means for inhibiting the central processing unit and independently controlling the data bus and loading the internal key.

3. The system according to claim 2, wherein the means for inhibiting the central processing unit acts on a clock input of the central processing unit.

4. A system for controlling access to protected data, said system comprising:
   storage means including a protected zone for storing the protected data, and a command input for denying or authorizing access to the protected data;
   protection means for controlling access to the protected data by selectively activating the command input of the memory;
   an internal key; and
   means for receiving an input key from the outside,
   wherein the protection means authorizes access to the protected data only when the internal key and the input key are identical,
   the system is integrated in a function block for storing data, the function block forming part of a microcircuit, and
   the protection means is inserted between a memory network comprising the protected data and the internal key, and connection ports to data and address buses and a validation input.

5. The system according to claim 4, wherein the internal key is stored in the storage means.

6. The system according to claim 5, wherein the internal key is stored in the protected zone of the storage means.

7. The system according to claim 4, wherein the storage means comprises a read control zone in which commands to read the internal key are stored.

8. The system according to claim 7, wherein access to the read control zone is governed by a command that is separate from a command to read the protected zone.

9. The system according to claim 4, wherein the internal key is loaded in the protection means by putting the storage means into dump mode.

10. The system according to claim 4, wherein the protection means is used to control access to the protected data from outside during a test mode.

11. The system according to claim 4,
    wherein the internal key occupies a plurality of addresses in the storage means, and
    the protection means comprises means for loading portions of the internal key from the storage means and corresponding portions of the input key, and means for authorizing access to the protected data only if all of the portions of the internal key and the corresponding portions of the input key are identical.

12. The system according to claim 4, wherein the storage means comprises a semiconductor read-only memory.

13. The system according to claim 4, wherein the protected data includes a source code of a microprogram.

14. A microcircuit comprising means for executing source code of a microprogram contained in the storage means of the system according to claim 4, wherein access to the source code of the microprogram from outside the microcircuit is controlled by the protection means of the system.

15. A semiconductor memory comprising the system according to claim 4.

16. An integrated microcircuit comprising;
a central processing unit;
storage means including a protected zone for storing protected data, and a command input for denying or authorizing access to the protected data;
protection means for controlling access to the protected data by selectively activating the command input of the memory;
an internal key; and
means for receiving an input key from the outside,
wherein the protection means authorizes access to the protected data only when the internal key and the input key are identical,
the storage means and the protection means are integrated in a function block for storing data, the function block forming part of a microcircuit, and
the protection means is inserted between a memory network comprising the protected data and the internal key, and connection ports to data and address buses and a validation input.

17. The integrated microcircuit according to claim 16, wherein the internal key is stored in the storage means.

18. The integrated microcircuit according to claim 16, wherein the protection means is connected to an internal link for loading the internal key and an external link for loading the input key, and
the protection means includes means of denying data communication for preventing a transfer of data from the internal link to the external link when the internal key is present on the internal link.

19. The integrated microcircuit according to claim 16, wherein the storage means comprises a read control zone in which commands to read the internal key are stored.

20. The integrated microcircuit according to claim 16 further comprising an element for selecting if the protection means is to be used at an initial stage.

* * * * *